(12) United States Patent
Blank et al.

(10) Patent No.: US 7,958,355 B2
(45) Date of Patent: Jun. 7, 2011

(54) KEYTOTE COMPONENT

(75) Inventors: William Thomas Blank, Bellevue, WA (US); Robert G. Atkinson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 11/365,566

(22) Filed: Mar. 1, 2006

(65) Prior Publication Data

US 2007/0208930 A1 Sep. 6, 2007

(51) Int. Cl.
H04L 9/32 (2006.01)
H04L 29/06 (2006.01)
G06F 1/12 (2006.01)
G06F 15/18 (2006.01)
H04K 1/00 (2006.01)

(52) U.S. Cl. ........ 713/171; 713/150; 713/172; 713/400; 713/500; 380/270; 380/273; 380/277; 380/278; 706/12; 706/14; 706/15; 706/23

(58) Field of Classification Search ................ 713/150, 713/168, 171, 172, 400, 500, 502, 503; 726/2, 726/20, 16, 17; 380/277, 278, 270, 273; 455/418, 419, 420, 41.1; 706/12, 13, 14, 706/15, 16, 20, 23, 25, 62
See application file for complete search history.

(56) References Cited

U.S. PATENT DOCUMENTS

| | | | | | |
|---|---|---|---|---|---|
| 4,607,230 | A | * | 8/1986 | Kaku et al. | 375/376 |
| 5,392,223 | A | * | 2/1995 | Caci | 709/218 |
| 5,982,520 | A | * | 11/1999 | Weiser et al. | 398/126 |
| 6,169,617 | B1 | * | 1/2001 | Tsuchiya et al. | 398/128 |
| 6,581,122 | B1 | * | 6/2003 | Sarat | 710/301 |
| 6,671,808 | B1 | * | 12/2003 | Abbott et al. | 726/4 |
| 6,701,091 | B2 | * | 3/2004 | Escobosa et al. | 398/107 |
| 7,032,240 | B1 | * | 4/2006 | Cronce et al. | 726/2 |
| 7,072,587 | B2 | * | 7/2006 | Dietz et al. | 398/138 |
| 7,213,766 | B2 | * | 5/2007 | Ryan et al. | 235/492 |
| 2001/0055395 | A1 | * | 12/2001 | Vogler | 380/273 |
| 2003/0102380 | A1 | * | 6/2003 | Spencer | 235/492 |
| 2004/0069853 | A1 | * | 4/2004 | Aharonson | 235/454 |
| 2004/0203590 | A1 | * | 10/2004 | Shteyn | 455/410 |
| 2004/0208632 | A1 | * | 10/2004 | Dietz et al. | 398/182 |
| 2006/0259951 | A1 | * | 11/2006 | Forssell et al. | 726/1 |
| 2007/0025554 | A1 | * | 2/2007 | Ong | 380/278 |
| 2007/0096866 | A1 | * | 5/2007 | Denison et al. | 340/5.23 |
| 2007/0248232 | A1 | * | 10/2007 | Driscoll et al. | 380/280 |

OTHER PUBLICATIONS

McDowell & Seyer, "USB Explained", Sep. 24, 1998, Prentice Hall, pp. 110-115.*
P.H. Dietz, et al., "Very Low Cost Sensing and Communication Using Bidirectional LEDS", International Conference on Ubiquitous Computing (UbiComp), TR2003-035, Oct. 2003 (UbiComp 2003).

* cited by examiner

Primary Examiner — Emmanuel L Moise
Assistant Examiner — Hilary Branske
(74) Attorney, Agent, or Firm — Lee & Hayes, PLLC (57) ABSTRACT

Systems and methods that facilitate introducing devices having digital characteristics to one another, to mitigate a man-in-the-middle attack. A keytote component supplies initial session keys for communication between devices, and includes a plurality of interfaces that can facilitate such communication. The keytote component can receive a key from a first device via one of a plulrality of communication interfaces associated with the keytote component. The user can then physically carry the keytote component to the vicinity of a second device for transferring the key thereto. As such, a man-in-the-middle attack can be mitigated, as an encrypted channel can be established in an insecure environment.

15 Claims, 10 Drawing Sheets

KEYTOTE COMPONENT

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well, hence resulting in new challenges.

For example, the growing use of digital devices in household appliances is causing an increasingly common problem of secure communications therebetween. Typically, users desire to cryptographically introduce their personal devices together. Such can include: securely connecting a Bluetooth headset to an associated cell phone so that nearby Bluetooth headsets cannot illegally obtain the use of such phone; securely connecting a new wireless laptop to an existing home wireless router while preventing next door neighbors from obtaining free access; and connecting a media center extender to a central media center PC, while avoiding data streaming into a neighbor's house. Likewise, content providers can require stringent installation conditions, so that premium content becomes available only to those customers that have paid for legal access.

In general, such appliances are being employed within insecure environments where access to their communication channel is possible. Also, in many associated protocols, the security gained by using passwords or other information known to a participant (e.g., "what you know" authentication factors) is often compromised; because people who employ such features often choose factors that are cryptographically weak, which can be guessed or discovered after a reasonable number of attempts. For example, people often choose passwords that are valid words in their language, are names or birthdates of a close relative, are addresses, and the like.

In addition, current encryption methods for communicating information between parties require that the communicating parties be able to recognize each other aside from the encrypted message. In other words, the communicating parties need to be able to verify that they are truly communicating with whom they think they are communicating. Often, current systems rely on Certification Authorities (CA's) to verify the identity of each party and to transfer secret keys to encode communications. Use of third parties to verify identities, however, presents a "man-in-the-middle" problem, whereby the man in the middle has access to secret information in the clear.

Moreover, systems are typically designed as a general-purpose system in which the personal identification number (PIN) that is to be protected is given no more consideration than any other message. In such systems, secret keys must typically be initialized for all devices that participate in a communication. Procedures for initializing and distributing the keys are part of a key management system, which is also responsible for physically securing the keys.

In these systems, the initialization procedure can be burdensome as it is a highly secretive process, and in general relies on a master key at the top of a hierarchy. Such a procedure can require a special, secure environment and entrusted officers to perform the procedure. Typically, these requirements can present logistical problems, because the initialization must be done on every peripheral that handles the PIN. Accordingly, the PIN is not protected in home banking, as it is in automated teller machines (ATMs), for example. Nor is such protection extended to other services provided by peripherals that are not readily accessible.

Even with all precautions, such a system cannot typically ensure adequate secrecy and security. Between an input device, for example, where a customer enters a PIN and the bank system where the PIN is verified, a number of intermediate systems are involved. By necessity, the involvement of these intermediate systems results in the sharing of the secret keys on the borders of each of these systems' control or jurisdiction. In sharing the secret keys and responsibilities, these intermediate systems present a security problem, because the PIN is decrypted with one key and encrypted again with another and appears in the clear.

Moreover such systems are expensive and yet inadequate in both logistics and security. Attempts to simplify the logistics of the key initialization procedure by using public key cryptography address one problem, namely, the initialization of system keys and introduces another problem of the same nature, namely, the initialization of public keys. These problems can persist as long as the system is a general purpose one in which the PIN is not given special consideration and the prior knowledge of the communicating parties is ignored, for example.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that facilitate introducing devices having digital characteristics to one another, via employing a keytote component that mitigates a man-in-the-middle attack. The keytote component supplies initial session keys for communication between devices, and includes a plurality of communication interfaces that can establish such communication. Initially, a user carries the keytote component near a first device (e.g., within several inches thereof) and establishes a communication therebetween for a key exchange. Such key is stored in a memory of the keytote component. The user can then physically carry the keytote component to the vicinity of a second device (e.g., within several inches thereof) for transferring the key thereto.

As such, a man-in-the-middle attack can be mitigated, as an encrypted channel can be established in an insecure environment, for example. Hence, any subsequent interception by an unauthorized party will typically not result in a successful attack, as communication between the first and second device is properly encrypted. In a related aspect, the act of physically carrying the keytote component from the first device to the second device, in itself indicates establishing an acceptable level of trust relationship between the first and second devices. The communication interfaces of the keytote component can implement technologies such as: light emitting diode (LED), Universal Serial Bus (USB), photosensor/detector(s), near field communications (NFC), and the like, to facilitate key exchange and interaction with the first and second devices.

According to a further aspect of the subject innovation, the keytote component can initially supply a clock training during transmission of the key exchange from the first device thereto. For example, the keytote component can initiate a key exchange protocol with the first device that has an LED, via a half-duplex communication—such as employing a 1200 baud communication with clock training, wherein the keytote component can determine clock rate of the first device, and can then communicate information with the first device at the determined baud rate. Moreover, the keytote component can maintain its memory that stores the key for a predetermined period (e.g., several hours) after which such memory can be erased and any information removed. Such memory can also be deleted by a user.

In a related methodology, the keytote component establishes a connection with a first device, wherein such communication can be a half duplex communication via an LED, for example. Subsequently, a key is transferred from the first device to the keytote component. Next, the keytote component is being physically moved from the first device to proximity of the second device and the key transferred from the keytote component thereto. The first device and the second device can then establish an encrypted transmission therebetween.

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
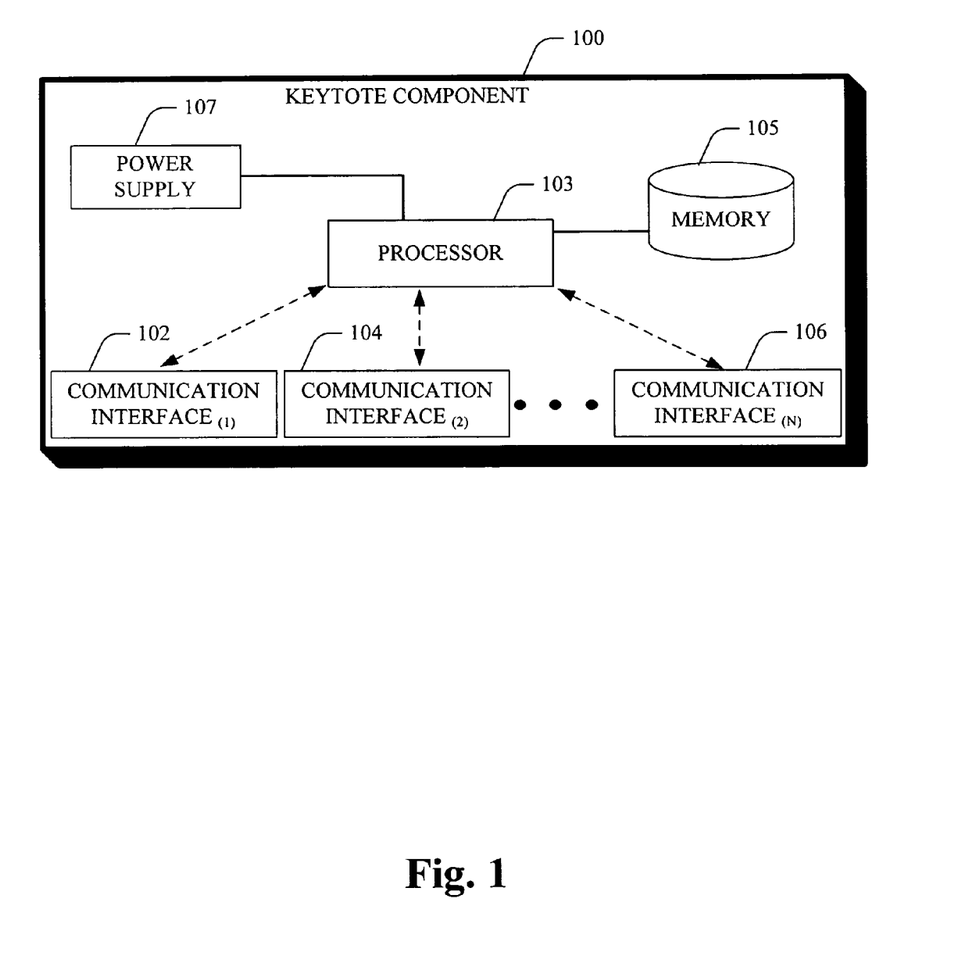
FIG. 1 illustrates a block diagram of a keytote component in accordance with an exemplary aspect of the subject innovation.

Turning initially to FIG. 1, a block diagram of a keytote component is illustrated in accordance with an exemplary aspect of the subject innovation. The keytote component 100 facilitates introducing devices having digital characteristics to one another, to mitigate a man-in-the-middle attack, via employing cryptographic techniques. In general, cryptography is the process for encrypting or encoding data item(s) such that the information can be stored and/or transmitted securely, and not decoded without a corresponding decryption key. Cryptography can be used to achieve data security, for example, via encryption of sensitive files, such that an intruder cannot understand them. When using cryptographic method(s), generally only the cryptographic key(s) remains secret. For example, the algorithm(s), the key size(s), and/or file format(s) can be made public without generally compromising security.

Using data encryption, a data item can be scrambled so that it appears like random gibberish, which is very difficult to transform back to the original data without a secret key. For example, the data item can be a document file, image file and/or any other type of data such a storage volume, physical disk block, and the like. Once a data item has been encrypted, it can be stored on non-secure media or transmitted over a non-secure network, and still remain secret. Subsequently, the data item can be decrypted into its original form. When a data item is encrypted, an encryption key is typically employed. This is comparable to a key that is used to lock a padlock. To decrypt the data item, a decryption key is employed. The encryption and decryption keys are often, but not always, the same key.

Such keytote component 100 supplies initial session keys for communication between devices, and includes a plurality of communication interfaces 102, 104, 106 (1 to N, where N is an integer). Such communication interfaces 102, 104, 106 can include Universal Serial Buses (USB) that provides a serial bus standard for connecting devices, Light Emitting Diodes (LED), Near Field Communication (NFC), and the like. Thus, the keytote component 100 can interact and/or communicate with a wide range of devices that employ such communication interfaces. For example, such keytote component 100 can supply initial session keys for communication between a wide range of devices, wherein each device can employ one or more communication feature.

The processor 103 can be an intelligent device that has the ability to sense or display information, or convert analog information into digital, or perform mathematical manipulation of digital data, or interpret the result of mathematical manipulation, or make decisions based on the information. As such, the processor 103 can be part of a logic unit, a computer or any other intelligent device capable of making decisions based on the data gathered via the communication interfaces 102, 104, 106. A memory 105 can be coupled to the processor 103 to store program code executed by the processor 103 for carrying out operating functions of the keytote component 100 as described herein.

The memory 105 can include read only memory (ROM) and random access memory (RAM). The ROM contains among other code the Basic Input-Output System (BIOS) which can control the basic operations of the communication interfaces 102, 104, 106. The RAM is the main memory into which the operating system and application programs can be loaded. The memory 105 also serves as a storage medium for storing information such as communication rates, patterns, and other data employed in communication with devices that pass and/or receive key from the keytote component 100. Power is provided to the processor 103 and other components forming the keytote component 100 by a power supply 107. In the event that the battery pack 107 fails or becomes disconnected from the keytote component 100, a supplemental power source (not shown) can also be provided to power the processor 103.

The communication interface(s) can include an LED(s) having a circuit that can alternately emit and detect light using the LED(s). Such LED(s) can be employed as a generic wireless serial data port that can communicate with an external device that has LED communication capabilities to exchange a key between the keytote component and the external device. The exchange key can be, a symmetric key, wherein it can subsequently facilitate an encryption and/or decryption dialog session key(s) that are used to encrypt and/or decrypt message(s) that form a dialog between a first device (initiator system) and a second device (target system) that are introduced to each other via the keytote component 100, as described in detail infra. It is to be appreciated that the subject innovation is not so limited and an asymmetric key can also be employed. The communication interface can also include RFID, USB, NFC, and the like.

Figure 2:
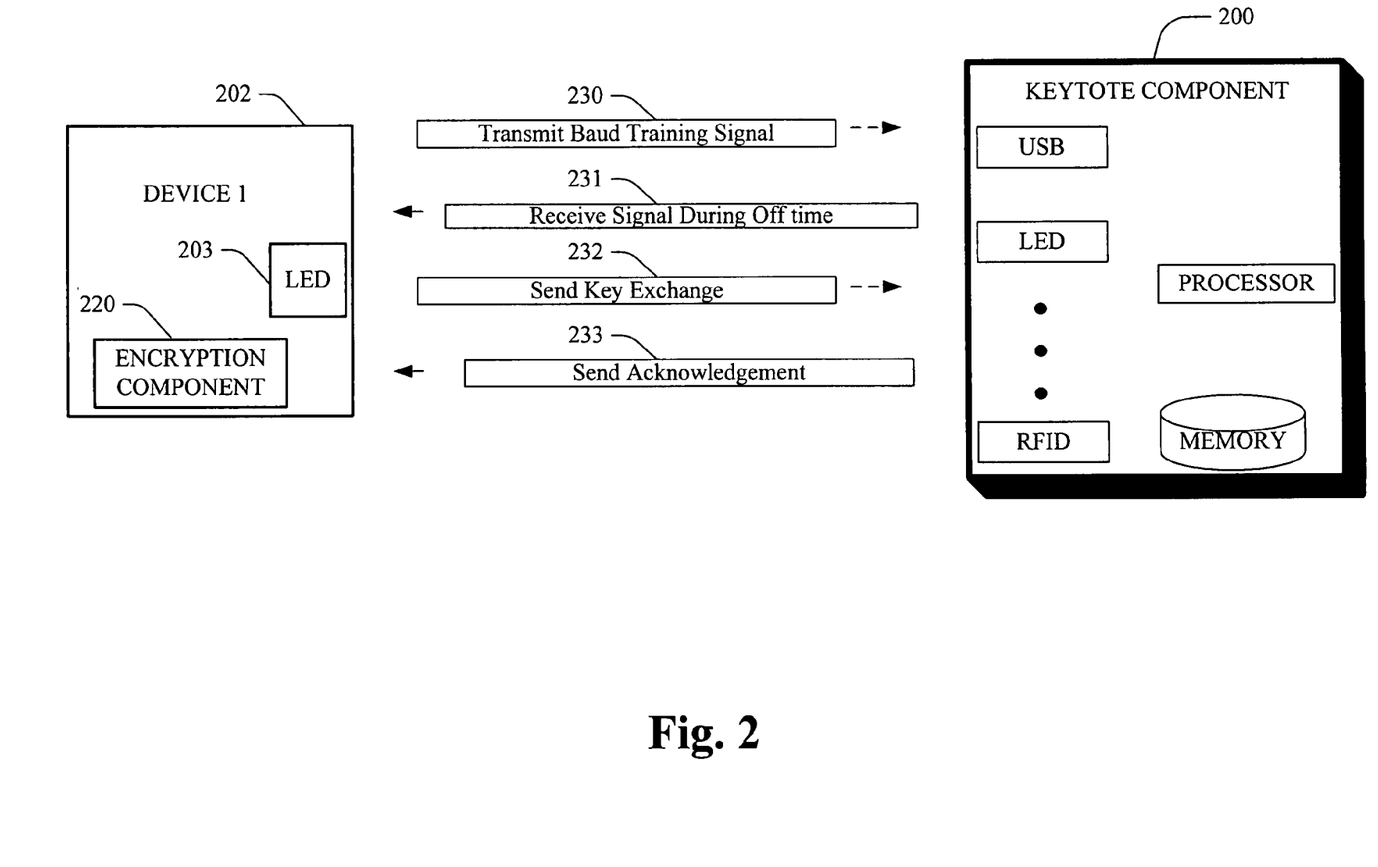
FIG. 2 illustrates a particular block diagram of a keytote component receiving a key from a first device in accordance with an aspect of the subject innovation.

FIG. 2 illustrates the keytote component 200 receiving a key exchange from a first device 202 in accordance with an aspect of the subject innovation. The first device 202 is a device having digital characteristics, and can include a computer, TV, PDA, electronic systems, intelligent household appliances, units with processing capabilities and the like. The keytote component 200 can communicate with the first device 202 via an LED in accordance with a particular example of the subject innovation. The LED 203 on such first device can transmit one baud time on and one baud time off, wherein during the baud time off a light switch explores its environment to seek if the keytote component 200 desires to talk to it.

The keytote component 200 can determine a period for a baud time "on", and a baud time "off" that is associated with the first device 202. As such, the keytote component 200 can determine with respect to its clock component, what constitutes one baud time. The keytote component 200 can determine clock rate of the first device 202, and can then communicate information with the first device 202 at the determined baud rate. In one particular example, since transaction periods are short (e.g., approximately within one or several seconds) and baud rates on or about 1200 bauds, then any drift of the clocks between the keytote component 200 and the first device 202 becomes negligible, as they can be correlated for example.

Moreover, effects of temperature and voltage changes can be considered negligible in the environment wherein the keytote component 200 and the first device 202 operate. The signal sent to the first device 202 by the keytote component 200 can be twice the baud rate, and as such the first device can notice that the keytote component 202 desires to initiate a communication therewith. The first device 202 can then turn off its LED 203, to acknowledge communication initiation of the keytote component 200.

As illustrated in FIG. 2, baud training signal can be transferred at 230 from the first device 202 to keytote component 200. At 231, the first device 202 receives a signal indicating that the keytote component 200 desires to talk. The first device 202 can subsequently send the key, at 232 followed by the acknowledgement by the keytote component 200, at 233.

In another example, the first device 202 can have a USB port instead or in addition to an LED. The keytote component 200 can then simply communicate therewith via a USB transfer, to exchange a key. As explained earlier, any of the communication interfaces such as light emitting diode (LED), Universal Serial Bus (USB), photosensor/detector(s), near field communications (NFC), voice frequencies and the like can be employed for key exchange between the keytote component 200 and the first device 202. As such, devices employing USB, NFC, can readily be introduced to devices that employ LED(s), via employing the keytote component 200. It is to be appreciated that the keytote component 200 typically need not have cryptographic capabilities, and such features are supplied via encryption components 220 associated with the devices that are introduced to each other. Thus, costs associated with the keytote component 200 can be mitigated. The keytote component of the subject innovation can be readily included as part of USB Memory sticks, which can be easily transported by a user. Additionally, various aspects of the subject innovation can be implemented at minimal additional cost in LED flashlights that are commonly employed in various applications.

Figure 3:
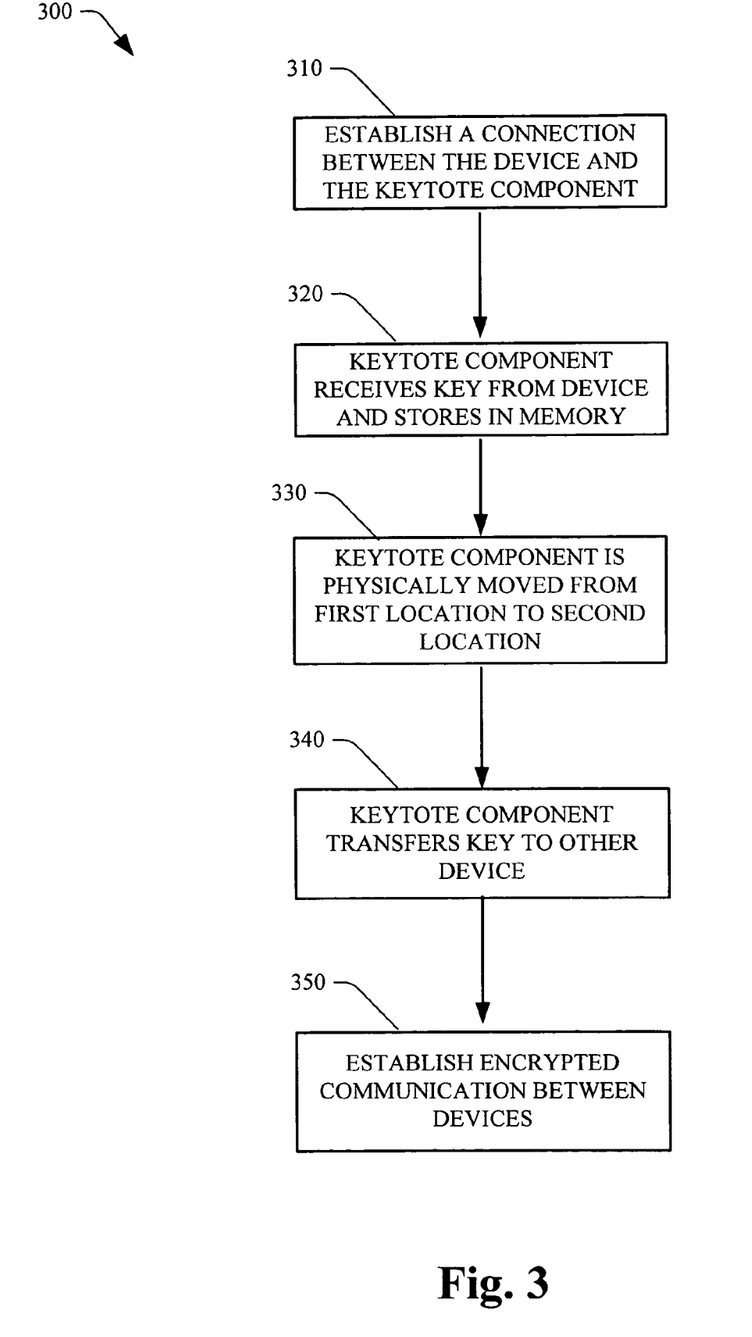
FIG. 3 illustrates a related methodology of introducing digital devices to each other via a keytote component, in accordance with an aspect of the subject innovation.

FIG. 3 illustrates a related methodology 300 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 310, the keytote component establishes a connection with a device, wherein such communication can be a half duplex communication via an LED, for example. Such communication can occur after the keytote component determines a clock rate of the device followed by communicating information with the device at that baud rate. Next and at 320, the keytote component receives and store a key from the device. Such key can be stored in the memory of the keytote component for a predetermined period, after which the key is automatically erased. Also, the user can be provided with an option to erase the memory of the keytote component at any time (e.g., by pressing a button located on the keytote component).

At 330, the keytote component is physically moved from a location associated with the device (e.g., several inches therefrom), to another location (e.g., several inches) to transfer the key to another device. Such act of physically carrying the keytote component between devices, itself indicates establishing an acceptable level of trust relationship between such devices. Next, and 340 the key can be transferred to the other device. At 350, both devices can establish communication, via an encrypted channel. As such, a man-in-the-middle attack can be mitigated, as an encrypted channel can be established in an insecure environment, for example. Hence, any subsequent interception by an unauthorized party will typically not result in a successful attack, as communication between the first and second device is properly encrypted.

Figure 4:
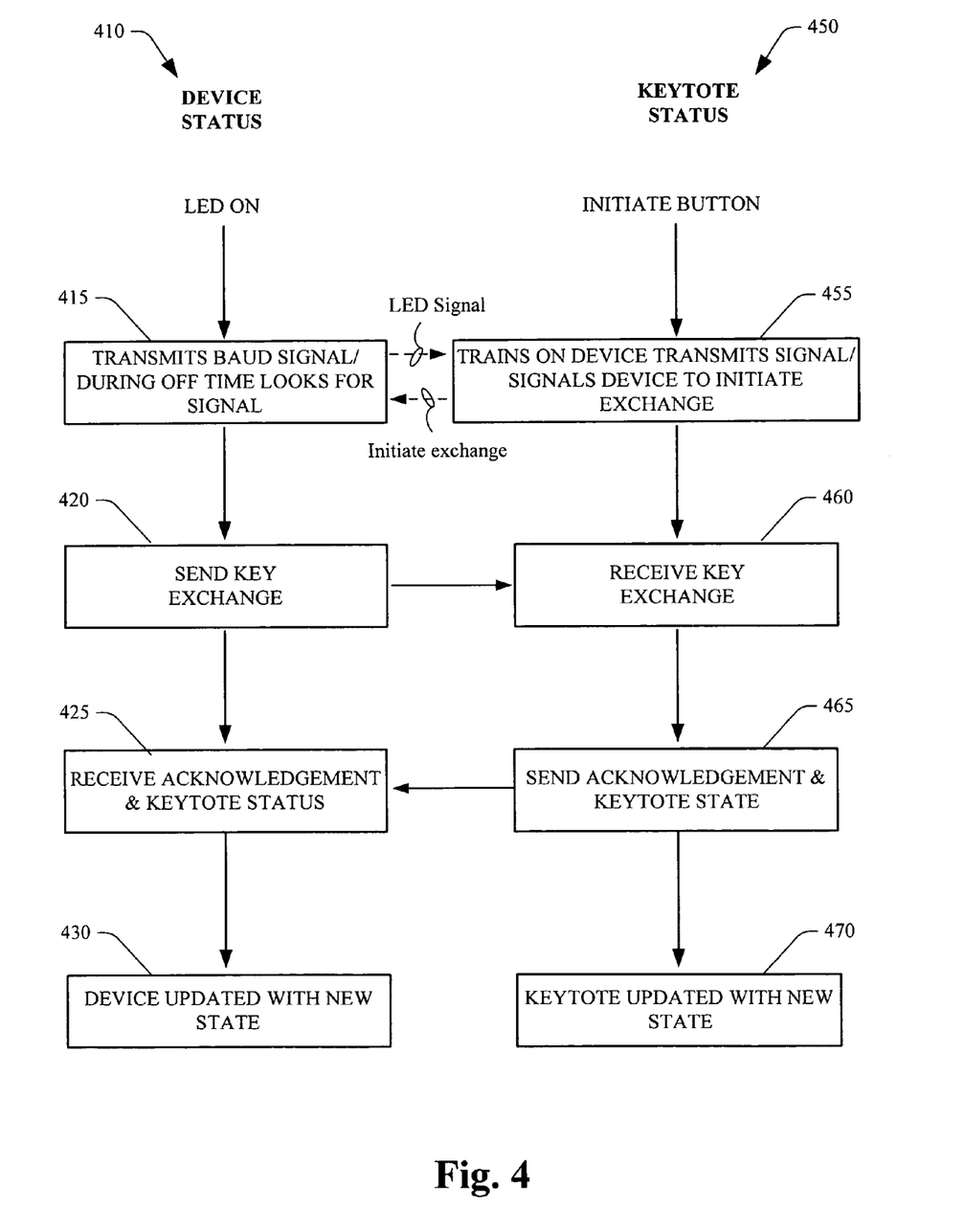
FIG. 4 illustrates a key exchange methodology between a device and a keytote component in accordance with an exemplary aspect of the subject innovation.

FIG. 4 illustrates a key exchange between a device 410 and a keytote component 450 in accordance with an exemplary aspect of the subject innovation. Typically messages exchanged can be fixed size or a pre-established size per a particular version or type. For example, a Byte protocol can employ an 8N1 RS232 style transmission. Moreover, the protocol version and packet size can be included in the initial message for each device. As noted earlier, clock insensitivity can be achieved by employing a timing training phase at 415 and 455 allowing the keytote component to train on the speed and clock rate of the Device. It is to be appreciated that many patterns are possible, and one simple method can include one baud time high and one baud time low with min and max allowed limits.

Such training method is feasible since the entire protocol takes around one second, and does not allow significant clock drift using even the cheapest of clock components. The protocol can be initiated by pressing a button on the keytote component. The device can initially have an LED that is on, and is subsequently turned off to acknowledge communication initiation of the keytote component. At 420 the device can send the key, which is received by the keytote component at 460. Subsequently, at 465 an acknowledgement is sent by the keytote component and received by the device at 425. Both the keytote component and the device and the keytote component can be updated at 430 and 470. As explained earlier, an LED can be employed for bi-directional half duplex communication. Moreover, rate matching associated with such communication can be obtained thru a training period that allows the devices and/or keytote component to match rates. In addition, crystal tolerances can be managed/regulated (e.g., tight crystal tolerances) so that clock rates are sufficiently close.

Figure 5:
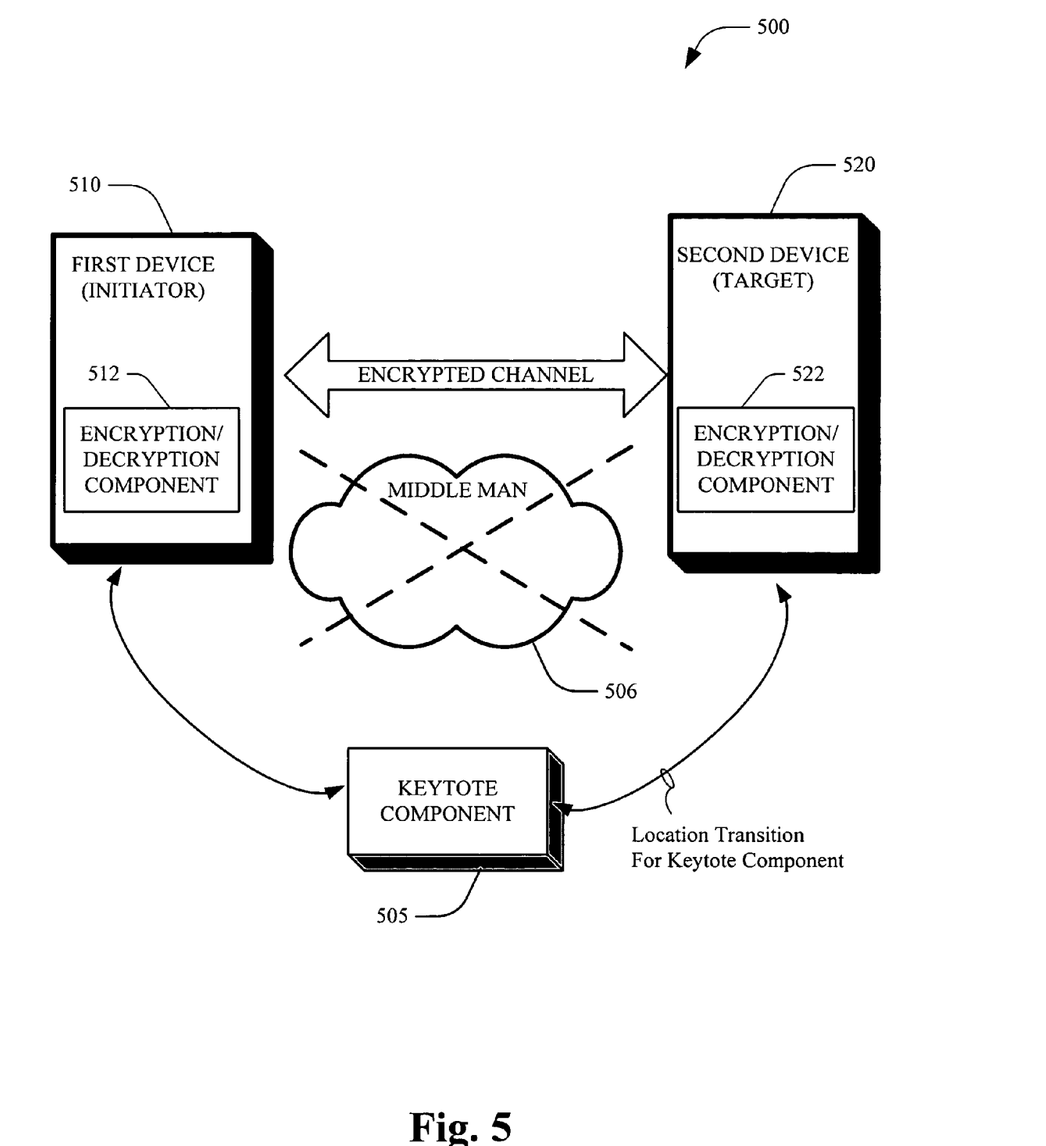
FIG. 5 illustrates an exemplary environment wherein a keytote component is physically carried from a first device to a second device.

FIG. 5 illustrates an exemplary environment 500, wherein a keytote component 505 is physically carried from the vicinity (e.g., several inches) of the first device 510 (first location), to the vicinity (e.g., several inches) of a second device 520 (second location), to deliver the key thereto. As such unique encryption/decryption keys for each communication session established between the first device 510 and the second device 520. When a communications session may remain active for transmission of extended quantities of data, it is an established practice to change the session key at intervals. Such use of keys can also reduce the amount of private information subject to exposure to unauthorized parties should a decryption key for a particular session be revealed by any means or should plaintext be determined by cryptanalysis.

Thus, the message data is encrypted at one dialog endpoint and not decrypted until it reaches the other dialog endpoint. Such dialog can refer to a single bidirectional streams of messages between two endpoints (e.g., initiator system and target system(s)). For example, two endpoints can have zero, one or more dialog(s) ongoing at any particular time. Moreover, all messages in a dialog are ordered and dialog messages are typically always delivered in the order sent. The order is maintained across transactions, across input threads, across output threads, and across crashes and restarts. Further, a "message" can include a conversation handle that uniquely identifies the dialog associated with it.

The act of physically moving the keytote component 505 from the first device 510 to the second device 520, to deliver the key typically assures the shared secret from being revealed to any unauthorized party, even though the messages being exchanged may be subject to scrutiny by outside observers. The term shared secret refers to information like encryption/decryption keys or parameters that are available collectively to authorized parties. A shared secret, for example, refers to information that is available to authorized parties but is not readily available to unauthorized parties.

When the keytote component 505 delivers the key to the second device 510, an encrypted communication channel can be established between the first device 510 and the second device 520, wherein a man-in-the-middle attack 506 can be mitigated. Accordingly, an encrypted channel can be established in an insecure environment, for example. Hence, any subsequent interception by an unauthorized party 506 will typically not result in a successful attack, as communication between the first device 510 and the second device 520 is properly encrypted. The act of physically carrying the keytote component 505 from the first device 510 to the second device 520, itself indicates establishing an acceptable level of trust relationship between the first and second devices 510, 520.

For example, the first supply a request to securely send a message to the second device 520. Each of device 510 and 520 can include a cryptographic component 512, 522 that can facilitate encryption and/or decryption of data (e.g., secure access to stored information). Such cryptographic component 512, 522 can receive a request for decryption information (e.g., decryption key and/or decryption algorithm) from its host device 510, 520. The cryptographic component 512, 522 retrieves the decryption information (e.g., decryption key and/or decryption algorithm), unlocks the decryption key and/or derives the decryption key. Communication can then be initiated between the first device 510 and the second device 520. In general, the keytote component 505 typically need not have cryptographic capabilities, and such features are supplied via encryption components 512, 522 associated with the devices that are introduced to each other. Thus, costs associated with the keytote component 505 can be mitigated.

Figure 6:
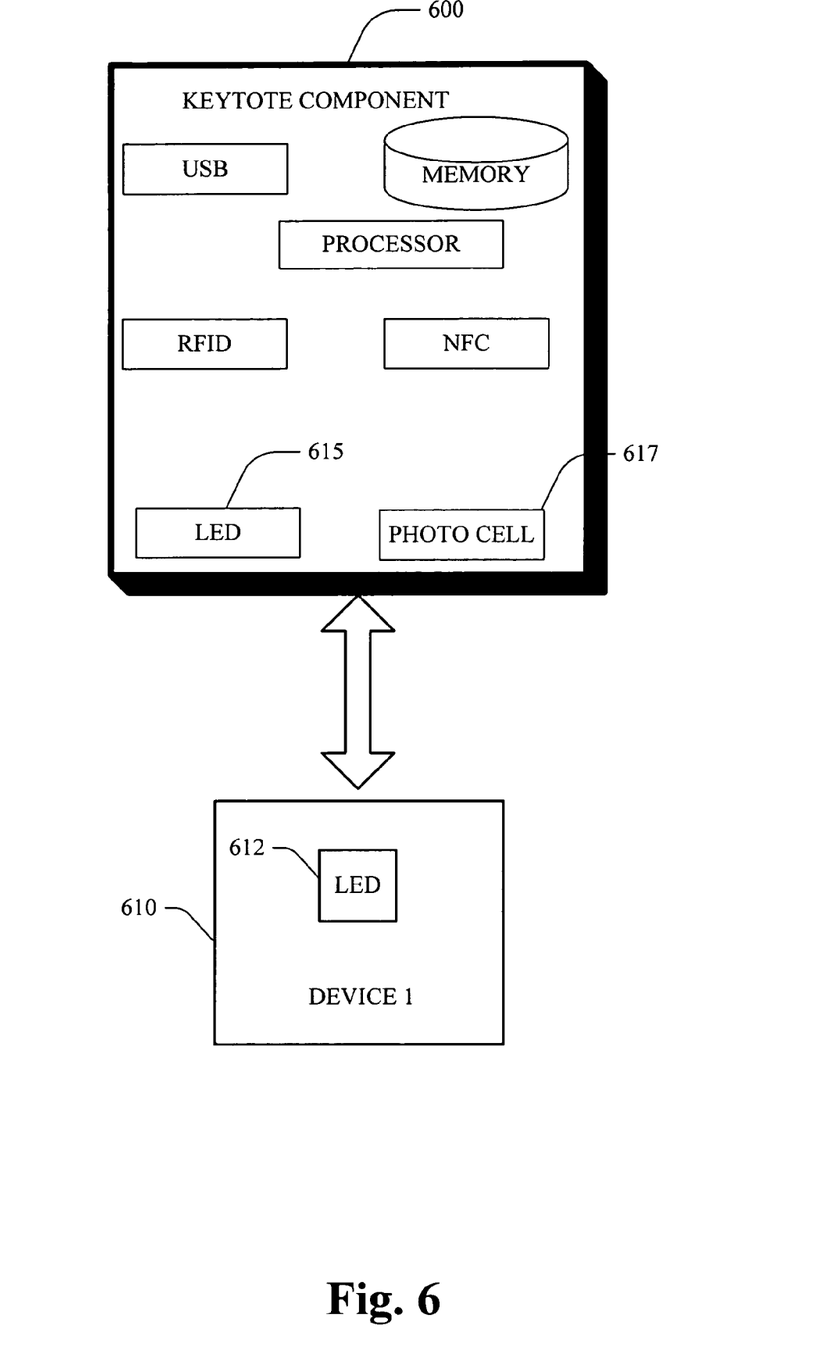
FIG. 6 illustrates a keytote component having a photo cell in accordance with a particular aspect of the subject innovation.

FIG. 6 illustrates a keytote component 600 in accordance with a particular aspect of the subject innovation. The keytote component 600 can employ an asymmetric approach where a home device (e.g. a light switch) 610 can typically use an inexpensive LED 612 as both the transmitter and receiver. At the same time, the keytote component 600 can employ both a very high intensity LED 615 for transmission and a highly sensitive photo detector 617 (e.g., a PIN diode) for a receiver. Such an arrangement allows very low-cost home devices to work with the keytote component 600, even home devices with poor LEDs.

Figure 7:
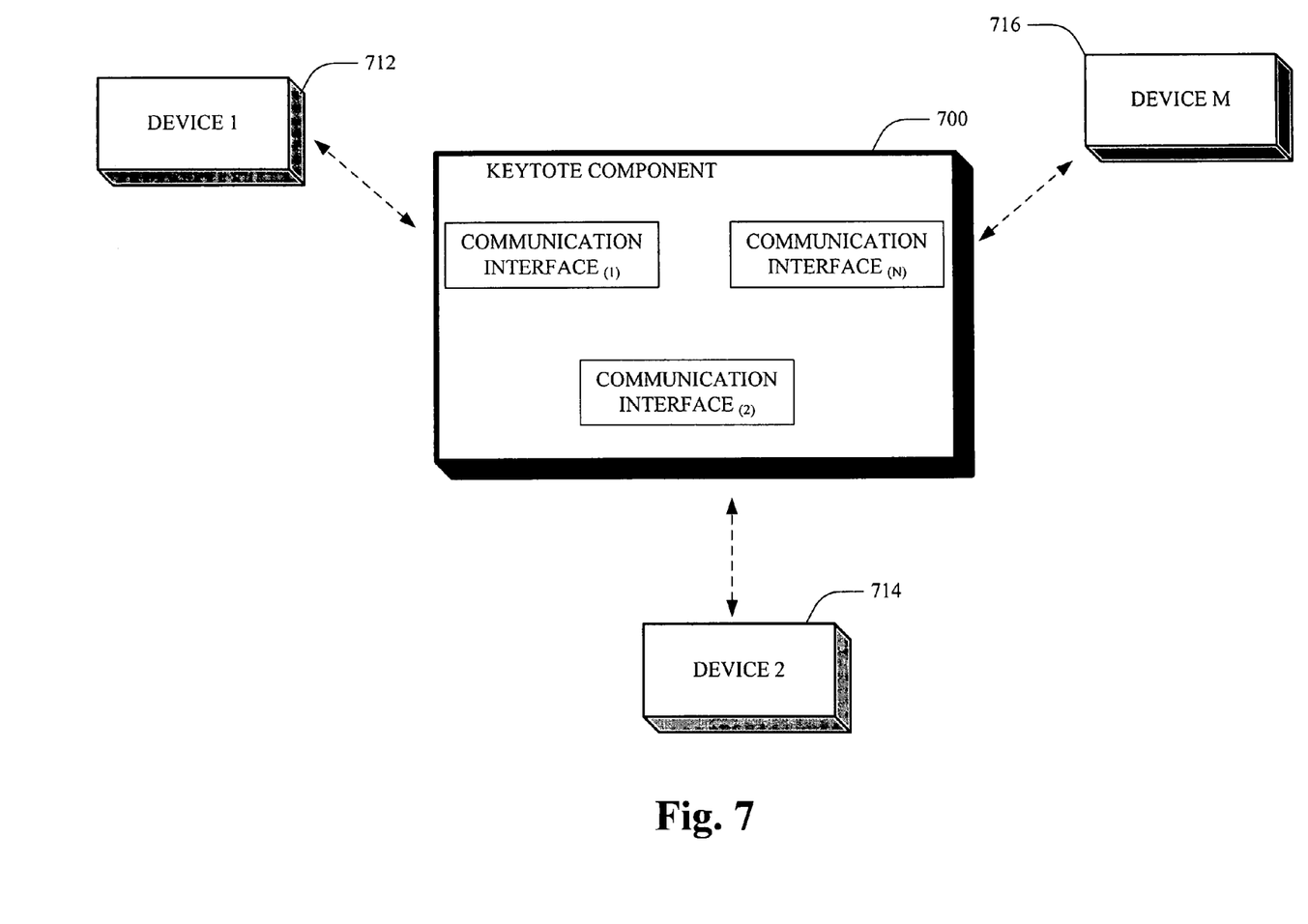
FIG. 7 illustrates a plurality of devices having digital characteristics, which can be introduced to each other via the keytote component.

FIG. 7 illustrates a plurality of devices 712, 714, 716 (1 thru M, M being an integer) having digital characteristics, which can be introduces to each other via the keytote component 700, to mitigate a man-in-the-middle attack. A shared key can be passed according to a variety of scenarios among devices 712, 714, 716. For example, if the secure system objective is to introduce all such devices to a central computer for an interaction therewith, the keytote component 700 can initially receive the key from such computer. Subsequently, a user can carry the keytote component 700 to each of the devices to deliver a key thereto. In another example, addition of a new device to the secure system can occur though introducing such new device to one of the previously introduced devices in the secure system, and not necessarily to the central computer. Accordingly, based on an objective of the secure system design, a plurality of introduction scenarios via the keytote component 700 can be implemented.

In a related aspect artificial intelligence (AI) components can be employed to facilitate choice of interface connection, and/or manner a network connection can be implemented via the keytote component of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
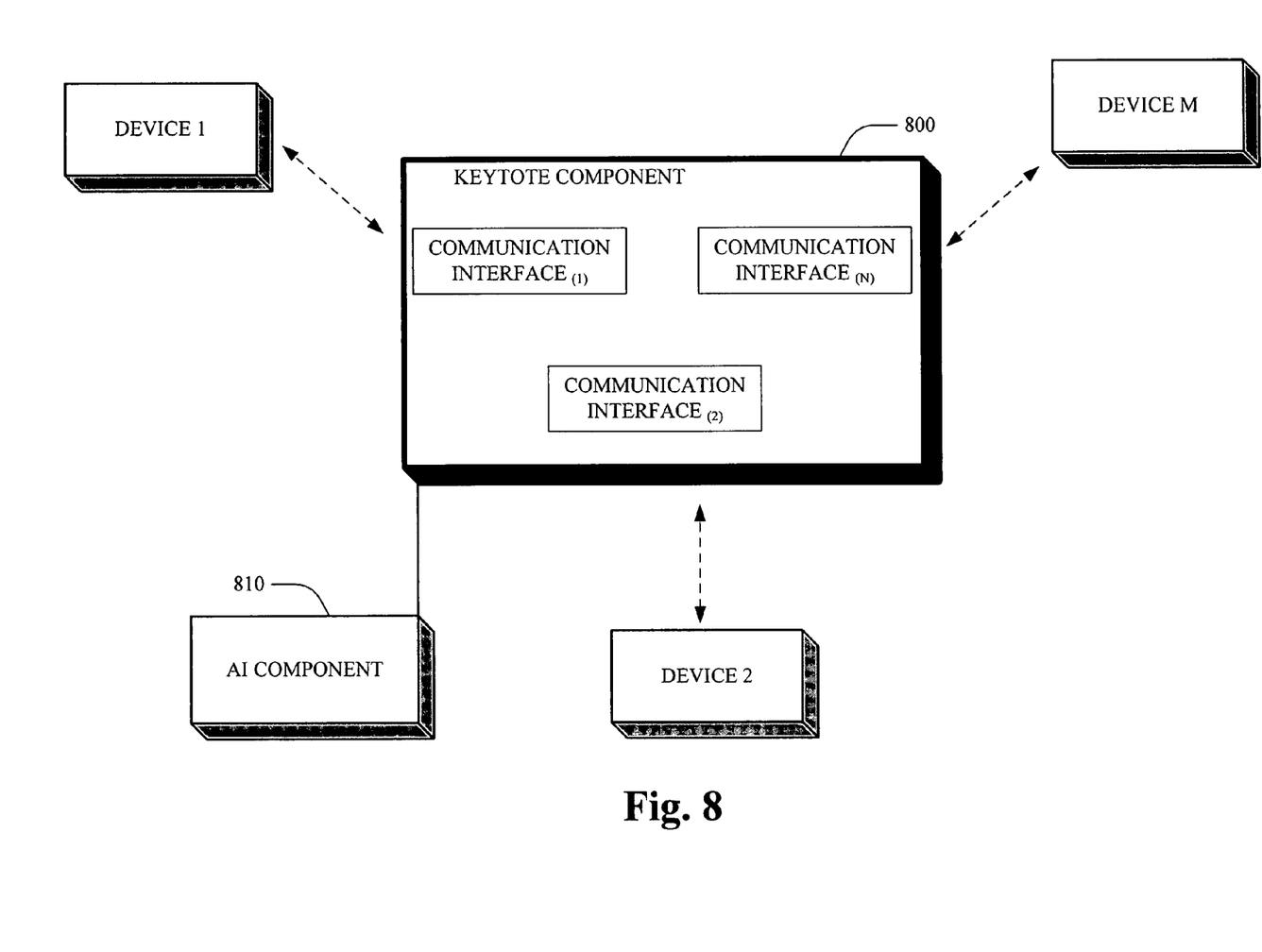
FIG. 8 illustrates an artificial intelligence component that can interact with the keytote component to facilitate network design in accordance with an aspect of the subject innovation.

FIG. 8 illustrates an artificial intelligence component 810 that can interact with the keytote component 800 to facilitate secure system design in accordance with an aspect of the subject innovation. For example, a process for determining which communication interface should be employed for communication between the keytote component and other devices, and in which order, can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed, and at what time of day to implement tighter criteria controls (e.g., in late evening when system performance would be less impacted).

Figure 9:
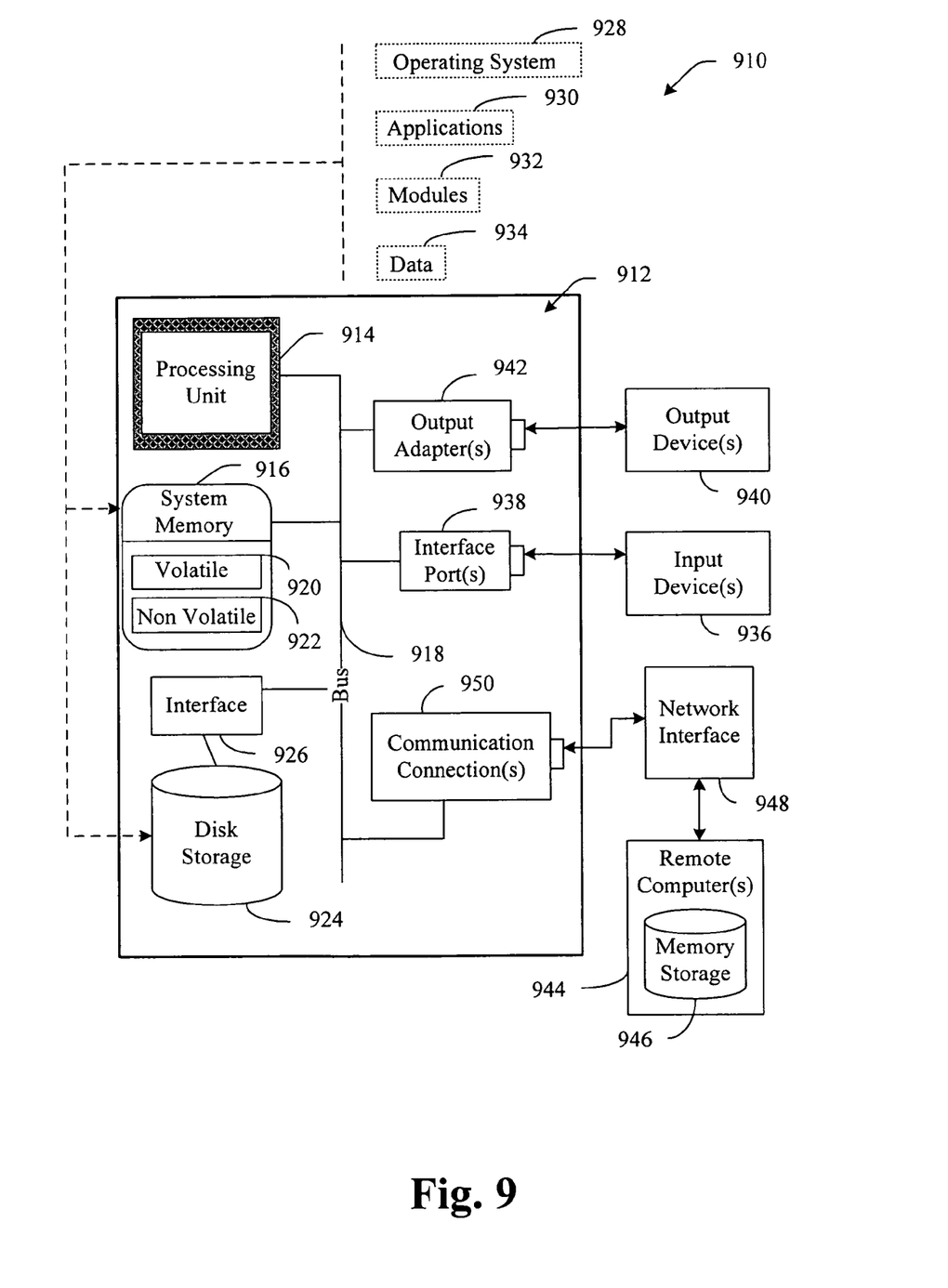
FIG. 9 illustrates an exemplary environment for implementing various aspects of the subject innovation.
Figure 10:
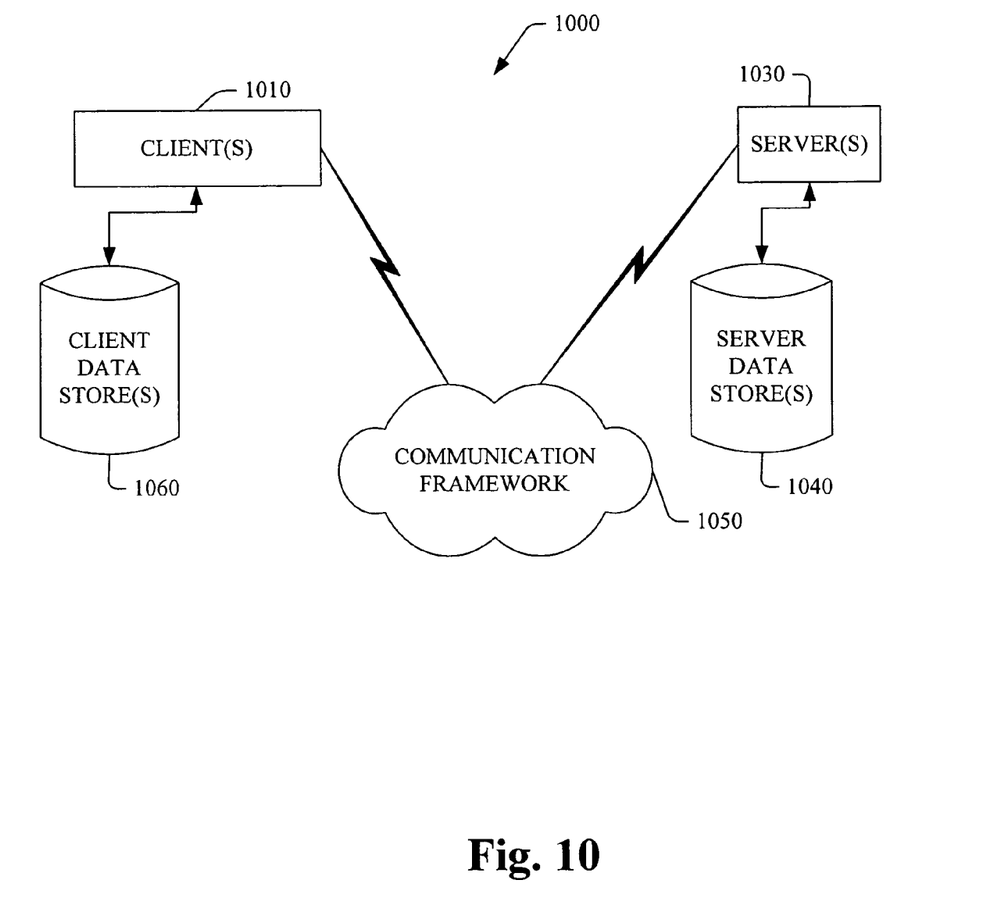
FIG. 10 is a schematic block diagram of an additional-computing environment that can be employed to implement the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementation of the keytote component in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A keytote component comprising:
a processor;
a plurality of communication interfaces coupled to the processor and configured to communicate with devices having encryption/decryption capabilities;
a storage device communicatively coupled to the processor, the storage device being capable of storing at least a key for encryption/decryption received from one of the devices; and
executable instructions configured to be operated by the processor to:
first initiate communication with a first of the devices through a first of the communication interfaces, the first initiating including receiving a baud training signal from the first device, using the baud training signal to determine a clock rate of the first device, and initiating a key transfer from the first device to the keytote, wherein the keytote and the first device are located in proximity to one another while communicating and wherein the initiating includes communicating with the first device at the determined clock rate;
receive the key from the first device through the first communication interface;
store the key in the storage device;
second initiate communication with a second of the devices through a second of the communication interfaces, the second of the communication interfaces being an LED, the LED being employed in a half-duplex channel, wherein the keytote and the second device are located in proximity to one another while communicating; and
provide the key to the to the second device through the second communication interface,
wherein the first and second devices are separate and distinct devices,
wherein the keytote component exchanges the key with the devices based on a byte protocol,
wherein the first of the communication interfaces is selected for the first of the devices by an artificial intelligence component that is operated by the processor and coupled to the storage device and the second of the communication interfaces is selected for the second of the devices by the artificial intelligence component, the artificial intelligence component performing the selecting based on an automatic classifier system,
wherein the first and second devices are in different locations and the keytote is physically carried from a location of the first device to a location of the second device to enable the first and second initiating of communications with the first and second devices and to introduce the first and second devices to one another via the keytote component,
wherein the first and second devices, upon being introduced, use the key to establish an encrypted channel between the first and second devices for communication between the first and second devices, and
wherein rate-matching between the keytote component and the second device is achieved by managing crystal tolerances associated with clocks.

2. The keytote component of claim 1, the first communication interface is at least one of a USB, NFC, RFID, and LED communication interface.

3. The keytote component of claim 1, the first communication interface is a same type as the second communication interface.

4. The keytote component of claim 1, further comprising a photo cell.

5. The keytote component of claim 1, wherein the storage device stores the key for a predetermined period.

6. The keytote component of claim 1, the key is one of a symmetric key and an asymmetric key.

7. The keytote component of claim 1, the first communication interface and the second communication interface communicate with the device(s) in a half-duplex channel.

8. A key exchange method via a keytote comprising:
first initiating communication with a first device through a first communication interface of the keytote, the first initiating including receiving a baud training signal from the first device, using the baud training signal to determine a clock rate of the first device, and initiating a key transfer from the first device to the keytote, wherein the keytote and the first device are located in proximity to one another while communicating and wherein the initiating includes communicating with the first device at the determined clock rate;
receiving the key from the first device via the first communication interface;
storing the key in memory of the keytote;
moving the keytote from a first location associated with the first device to a second location associated with a second device;
second initiating communication with a second device through a second communication interface, the second communication interface being an LED, the LED being employed in a half-duplex channel, wherein the keytote and the second device are located in proximity to one another while communicating; and
transferring the key from the keytote to the second device via a second communication interface,
wherein the first and second devices are separate and distinct devices,
wherein the keytote exchanges the key with the devices based on a byte protocol,
wherein the first communication interface is selected for the first device by an artificial intelligence component that is operated by the processor and coupled to the storage device and the second communication interface is selected for the second device by the artificial intelligence component, the artificial intelligence component performing the selecting based on an automatic classifier system,
wherein the moving enables introducing the first and second devices to one another via the keytote,
wherein the first and second devices, upon being introduced, use the key to establish an encrypted channel between the first and second devices for communication between the first and second devices, and
wherein rate-matching between the keytote and the second device is achieved by managing crystal tolerances associated with clocks.

9. The key exchange method of claim 8, wherein the key is stored in the memory of the keytote for a predetermined period.

10. The key exchange method of claim 8, further comprising deleting contents of the memory of the keytote.

11. The key exchange method of claim 8, further comprising sending an acknowledgement by the keytote to the first device.

12. The key exchange method of claim 8, further comprising employing a photo cell to perform the receiving of the key.

13. The key exchange method of claim 8, wherein the key is one of a symmetric key and an asymmetric key.

14. The key exchange method of claim 8, wherein the first communication interface is one of a USB, NFC, and RFID communication interface.

15. A keytote component comprising:
   a plurality of communication interface means for communicating with devices having encryption/decryption capabilities;
   a storage device means communicatively coupled to the communication interface means, the storage device means for storing at least a key for encryption/decryption received from one of the devices; and
   means coupled to the storage device means and communication interface means for:
      first initiating communication with a first of the devices through a first of the communication interfaces, the first initiating including receiving a baud training signal from the first device, using the baud training signal to determine a clock rate of the first device, and initiating a key transfer from the first device to the keytote, wherein the keytote component and the first device are located in proximity to one another while communicating and wherein the initiating includes communicating with the first device at the determined clock rate;
      receiving a key from the first device through the first communication interface;
      storing the key in the storage device;
      second initiating communication with a second of the devices through a second of the communication interfaces, the second communication interface being an LED, the LED being employed in a half-duplex channel, wherein the keytote component and the second device are located in proximity to one another while communicating; and
      providing the key to the to the second device through the second communication interface,
   wherein the first and second devices are separate and distinct devices,
   wherein the keytote component exchanges the key with the devices based on a byte protocol,
   wherein the first communication interface is selected for the first device by an artificial intelligence component that is operated by the processor and coupled to the storage device and the second communication interface is selected for the second device by the artificial intelligence component, the artificial intelligence component performing the selecting based on an automatic classifier system,
   wherein the first and second devices are in different locations and the keytote component is physically carried from a location of the first device to a location of the second device to enable the first and second initiating of communications with the first and second devices and to introduce the first and second devices to one another via the keytote component,
   wherein the first and second devices, upon being introduced, use the key to establish an encrypted channel between the first and second devices for communication between the first and second devices, and
   wherein rate-matching between the keytote component and the second device is achieved by managing crystal tolerances associated with clocks.

* * * * *